US012639150B2

(12) United States Patent
    Mylavarapu

(10) Patent No.: US 12,639,150 B2
(45) Date of Patent: May 26, 2026

(54) ERROR TRACKING BY A MEMORY SYSTEM

(71) Applicant: Micron Technology, Inc., Boise, ID (US)

(72) Inventor: Sai Krishna Mylavarapu, Folsom, CA (US)

(73) Assignee: Micron Technology, Inc., Bosie, ID (US)

( * ) Notice: Subject to any disclaimer, the term of this patent is extended or adjusted under 35 U.S.C. 154(b) by 88 days.

(21) Appl. No.: 18/391,371

(22) Filed: Dec. 20, 2023

(65) Prior Publication Data

US 2024/0248781 A1     Jul. 25, 2024

Related U.S. Application Data

(60) Provisional application No. 63/439,947, filed on Jan. 19, 2023.

(51) Int. Cl.
    *G06F 11/00*          (2006.01)
    *G06F 11/07*          (2006.01)
(52) U.S. Cl.
    CPC ...... *G06F 11/0787* (2013.01); *G06F 11/0727* (2013.01)
(58) Field of Classification Search
    None
    See application file for complete search history.

(56) References Cited

U.S. PATENT DOCUMENTS

| | | | |
|---|---|---|---|
| 2011/0205654 A1* | 8/2011 | Sakurai .............. | G11B 20/1833 360/53 |
| 2020/0083907 A1* | 3/2020 | Goel ..................... | H03M 13/13 |
| 2021/0049068 A1* | 2/2021 | Schaefer ............ | G06F 11/1076 |
| 2022/0066871 A1* | 3/2022 | Lu ........................... | G06F 21/79 |
| 2024/0403155 A1* | 12/2024 | Schaefer ............ | G06F 11/1048 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S McCarthy
(74) *Attorney, Agent, or Firm* — Holland & Hart LLP

(57)          ABSTRACT

Methods, systems, and devices for error tracking by a memory system are described. A memory system transmit indications of corrupt data without storing (e.g., internally storing) the indication. In some examples, a memory system may read data (e.g., from an associated memory device) and detect an error in the data. The memory system may generate an indication of the error and may transmit the indication to a host device. In other examples, a host device may transmit corrupted data with an indication of such. The memory system may store the corrupt data (e.g., an inverted version of the corrupt data) and, upon receiving a subsequent read command, may transmit the corrupt data to the host system with an indication that the data is corrupt.

20 Claims, 7 Drawing Sheets

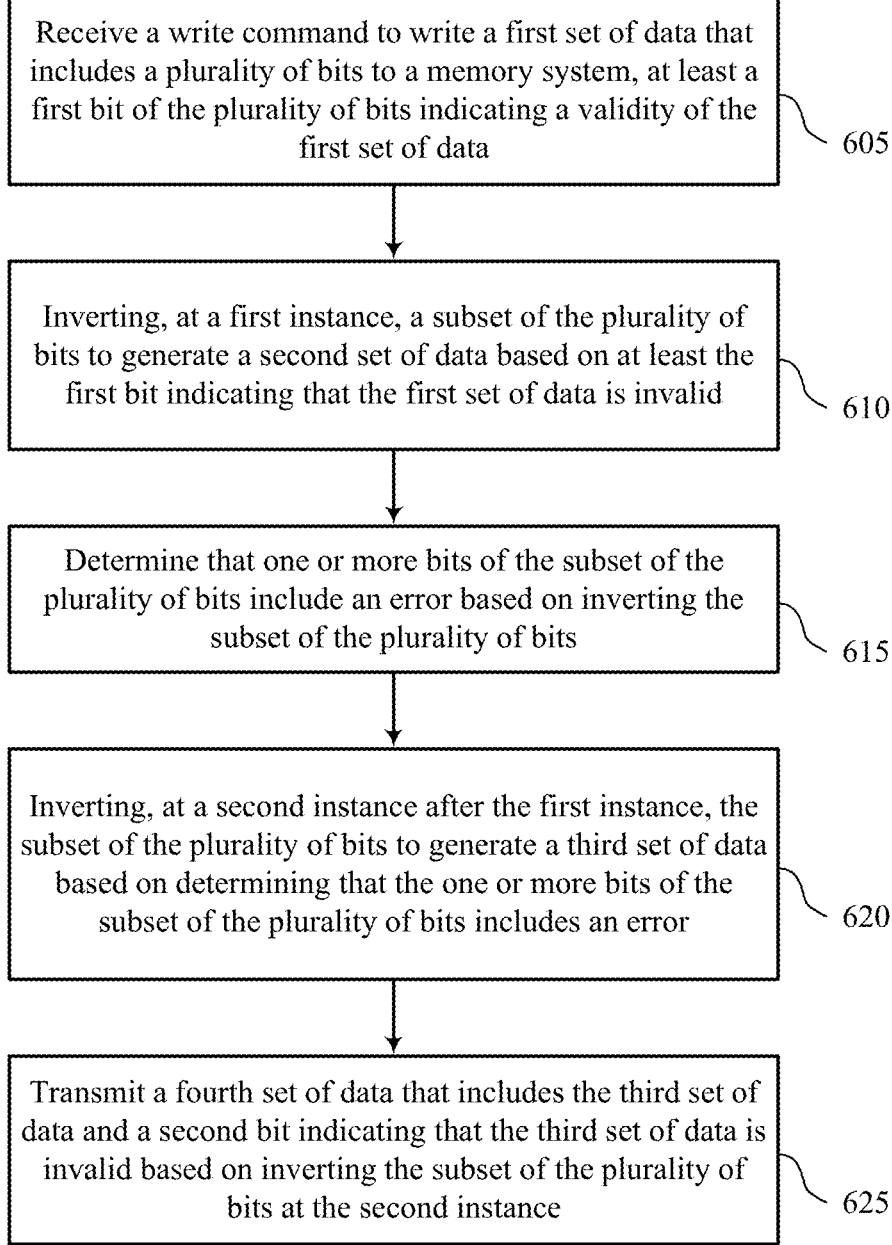

Receive a write command to write a first set of data that includes a plurality of bits to a memory system, at least a first bit of the plurality of bits indicating a validity of the first set of data

605

Inverting, at a first instance, a subset of the plurality of bits to generate a second set of data based on at least the first bit indicating that the first set of data is invalid

610

Determine that one or more bits of the subset of the plurality of bits include an error based on inverting the subset of the plurality of bits

615

Inverting, at a second instance after the first instance, the subset of the plurality of bits to generate a third set of data based on determining that the one or more bits of the subset of the plurality of bits includes an error

620

Transmit a fourth set of data that includes the third set of data and a second bit indicating that the third set of data is invalid based on inverting the subset of the plurality of bits at the second instance

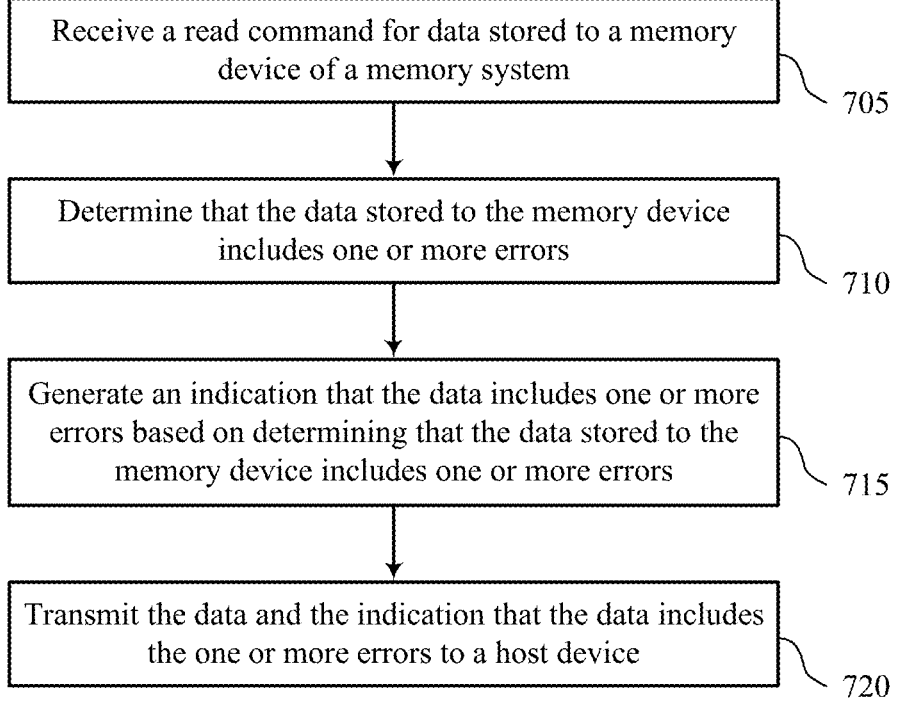

Receive a read command for data stored to a memory device of a memory system

705

Determine that the data stored to the memory device includes one or more errors

710

Generate an indication that the data includes one or more errors based on determining that the data stored to the memory device includes one or more errors

715

Transmit the data and the indication that the data includes the one or more errors to a host device

ERROR TRACKING BY A MEMORY SYSTEM

CROSS REFERENCE

The present application for patent claims the benefit of U.S. Provisional Patent Application No. 63/439,947 by MYLAVARAPU, entitled "ERROR TRACKING BY A MEMORY SYSTEM," filed Jan. 19, 2023, assigned to the assignee hereof, and expressly incorporated by reference herein.

TECHNICAL FIELD

The following relates to one or more systems for memory, including error tracking by a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 6 and 7 illustrate flowcharts showing a method or methods that support error tracking by a memory system in accordance with examples as disclosed herein.

DETAILED DESCRIPTION

Some interfaces (e.g., the Compute Express Link (CXL) interface) may provide interconnections between memory systems, memory devices, and host devices. The interconnection may provide coherency between the memory of a host (e.g., host, controller) and the memory of associated devices by facilitating the sharing of data and other resources. In some cases, however, this sharing of data may also enable the sharing of erroneous (e.g., poisoned) data. As such, the CXL interface may use a flag communicated with any data transmitted between a host device and associated memory devices to indicate errors within the data. In such a case, after the host device or memory device transmits the flag and data to one or more memory devices, the flag may be stored to the memory devices. To store this flag, the memory devices may use additional memory space, which may increase the complexity of the memory device and thus reduce its overall reliability.

In accordance with examples described herein, a memory system may be configured to identify and track errors in data without storing an associated flag. For example, a host device may transmit a command (e.g., a read command) to a memory system. The memory system may read the associated data (e.g., one or more bits) and may determine that the data includes one or more errors. In some examples, the memory system may generate an indication of the error and may transmit the indication and the data to the host device (e.g., without storing the indication).

In other examples, the host device may intentionally transmit corrupt (e.g., poisoned) data to the memory system. In such examples, the host device may transmit an indication (e.g., a poison bit) with the transmitted data. As such, the memory system may invert one or more bits of the received data and may subsequently store the inverted data (e.g., without the poison bit). Upon reading the data, the memory system may determine that the data is corrupt and may generate an indication of the error (e.g., a poison bit). In some examples, the memory system may transmit the corrupt data and the indication to the host device. By transmitting indications of corrupt data as described herein, the memory system may store less data which may decrease its complexity and increase its overall reliability.

Features of the disclosure are initially described in the context of systems as described with reference to FIGS. 1 and 2. Features of the disclosure are described in the context of process flows as described with reference to FIGS. 3 and 4. These and other features of the disclosure are further illustrated by and described with reference to an apparatus diagram and flowcharts that relate to error tracking by a memory system as described with reference to FIGS. 5 through 7.

Figure 1:
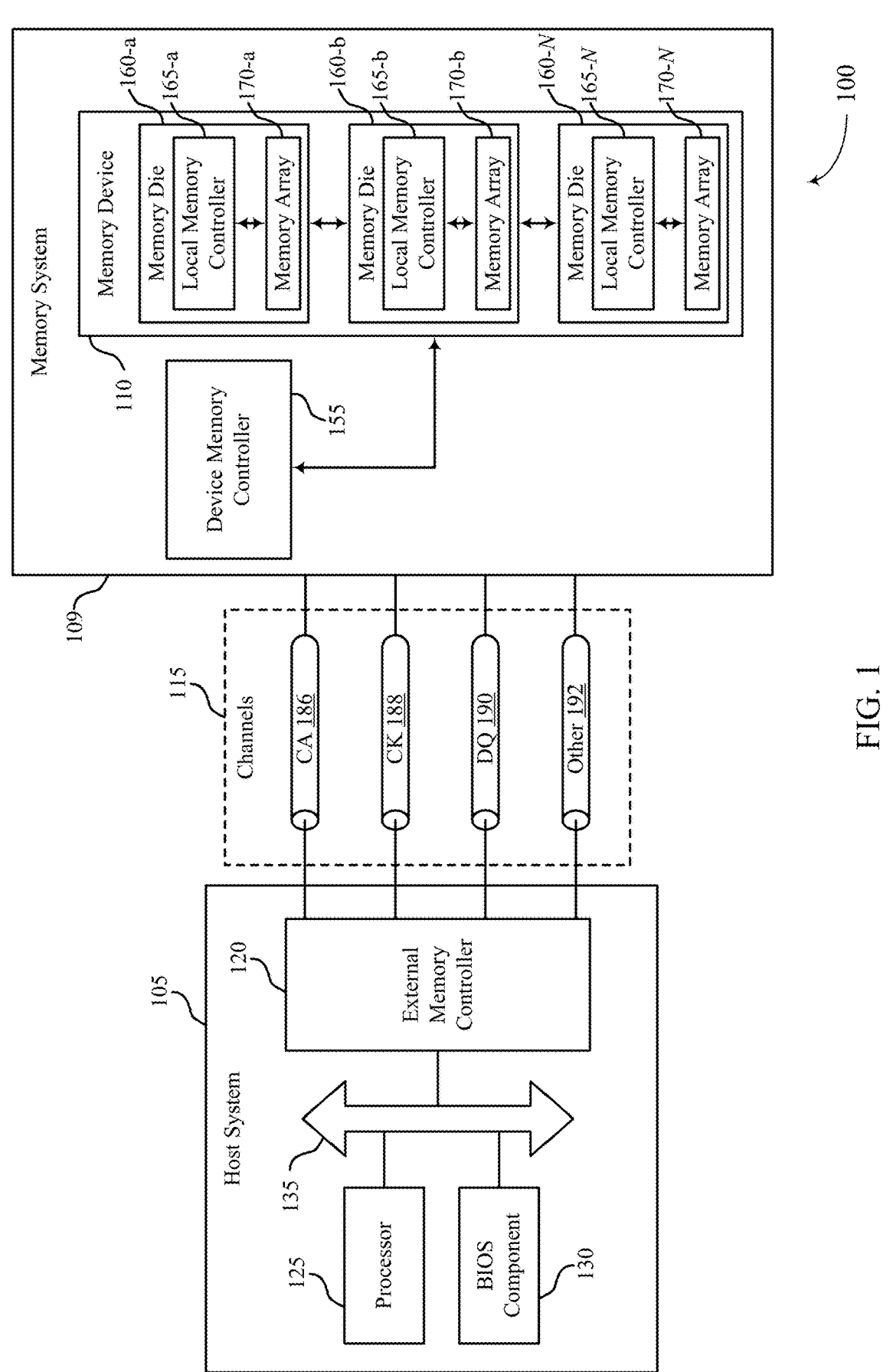
FIGS. 1 and 2 illustrate examples of systems that support error tracking by a memory system in accordance with examples as disclosed herein.

FIG. 1 illustrates an example of a system 100 that supports error tracking by a memory system in accordance with examples as disclosed herein. The system 100 may include a host system 105, a memory system 109, a memory device 110, and a plurality of channels 115 coupling the host system 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host system 105. The host system 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host system 105 may refer to the hardware, firmware, software, or any combination thereof that implements the functions of an external memory controller 120. In some examples, the external memory controller 120 may be referred to as a host (e.g., host system 105).

A memory device 110 may be an independent device or a component that is operable to provide physical memory addresses/space that may be used or referenced by the system 100. In some examples, a memory device 110 may be configurable to work with one or more different types of host devices. Signaling between the host system 105 and the memory device 110 may be operable to support one or more of: modulation schemes to modulate the signals, various pin configurations for communicating the signals, various form factors for physical packaging of the host system 105 and the memory device 110, clock signaling and synchronization between the host system 105 and the memory device 110, timing conventions, or other functions.

The memory device 110 may be operable to store data for the components of the host system 105. In some examples, the memory device 110 (e.g., operating as a secondary-type device to the host system 105, operating as a dependent-type device to the host system 105) may respond to and execute commands provided by the host system 105 through the external memory controller 120. Such commands may include one or more of a write command for a write operation, a read command for a read operation, a refresh command for a refresh operation, or other commands.

The host system 105 may include one or more of an external memory controller 120, a processor 125, a basic input/output system (BIOS) component 130, or other components such as one or more peripheral components or one or more input/output controllers. The components of the host system 105 may be coupled with one another using a bus 135.

The processor 125 may be operable to provide functionality (e.g., control functionality) for the system 100 or the host system 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host system 105. The BIOS component 130 may also manage data flow between the processor 125 and the various components of the system 100 or the host system 105. The BIOS component 130 may include instructions (e.g., a program, software) stored in one or more of read-only memory (ROM), flash memory, or other non-volatile memory.

The memory device 110 may be included in a memory system 109. The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host system 105. For example, the memory device 110 may receive a write command indicating that the memory device 110 is to store data received from the host system 105, or receive a read command indicating that the memory device 110 is to provide data stored in a memory die 160 to the host system 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host system 105, such as the processor 125, and the memory device 110). The external memory controller 120 may process (e.g., convert, translate) communications exchanged between the components of the host system 105 and the memory device 110. In some examples, the external memory controller 120, or other component of the system 100 or the host system 105, or its functions described herein, may be implemented by the processor 125. For example, the external memory controller 120 may be hardware, firmware, or software, or some combination thereof implemented by the processor 125 or other component of the system 100 or the host system 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host system 105 may exchange information with the memory device 110 using one or more channels 115. The channels 115 may be operable to support communications between the external memory controller 120 and the memory device 110. Each channel 115 may be an example of a transmission medium that carries information between the host system 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host system 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, data channels 190 may be operable to communicate information (e.g., data, control information) between the host system 105 and the memory system 109. For example, the data channels 190 may communicate information (e.g., bi-directional) to be written to the memory device 110 or information read from the memory device 110 of the memory system 109.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, the memory system 109 may be configured to identify and track errors in data stored to the memory device 110 without storing an associated flag. For example, a host system 105 may transmit a command (e.g., a read command) to the memory system 109. The device memory controller 155 may read the associated data (e.g., one or more bits) from a memory array 170 and may determine that the data includes one or more errors. In some examples, the device memory controller 155 may generate an indication of the error and may transmit the indication and the data to the host system 105 (e.g., without storing the indication).

In other examples, the host system 105 may intentionally transmit corrupt (e.g., poisoned) data to the memory system 109. In such examples, the host system 105 may transmit an indication (e.g., a poison bit) with the transmitted data. As such, the device memory controller 155 may invert one or more bits of the received data and may subsequently store the inverted data (e.g., without the poison bit) to a memory array 170. Upon reading the data, the device memory controller 155 may determine that the data is corrupt and may generate an indication of the error (e.g., a poison bit). In some examples, the device memory controller 155 may transmit the corrupt data and the indication to the host system 105. By transmitting indications of corrupt data as described herein, the memory system 109 may store less data which may decrease its complexity and increase its overall reliability.

Figure 2:
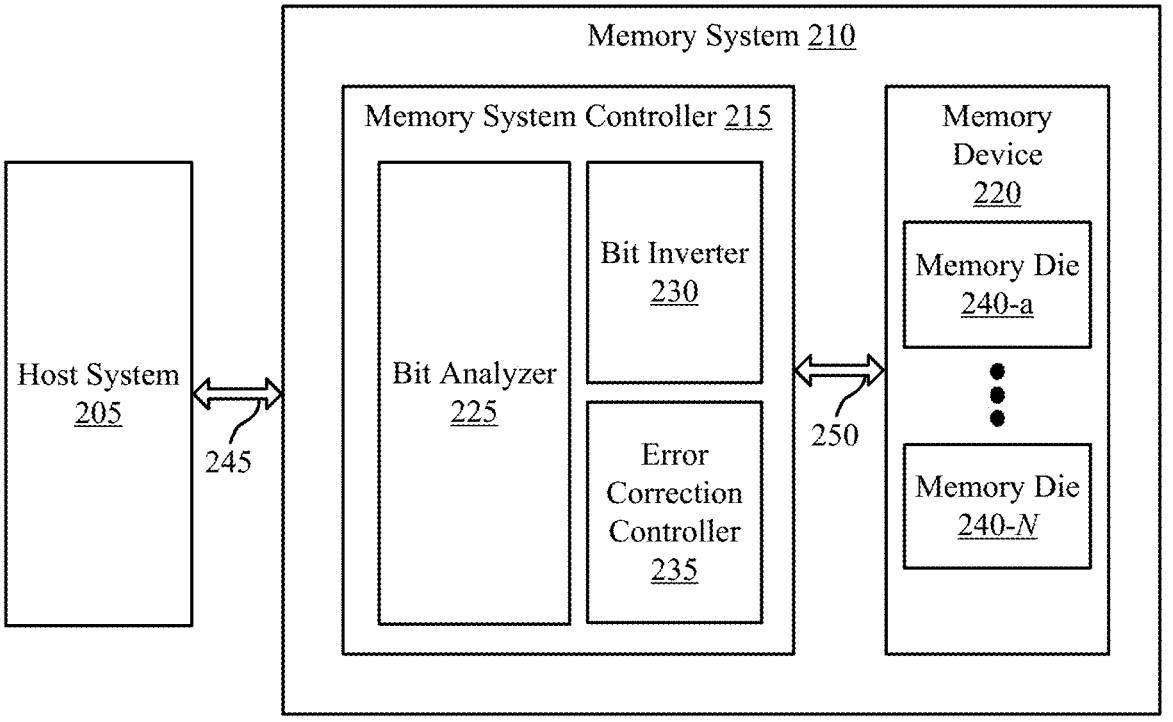

FIG. 2 illustrates an example of a system 200 that supports error tracking by a memory system in accordance with examples as disclosed herein. The system 200 may be an example of and implement aspects of the system 100, as described with reference to FIG. 1. For example, the system 200 may include a memory system 210 and a host system 205, which may be examples of a host system 105 and a memory device 110, as described with reference to FIG. 1. In some examples, the memory system 210 may transmit indications of corrupt data, which may result in the memory system 210 storing less data which may decrease its complexity and increase its overall reliability.

The memory system 210 may include a memory system controller 215, which may be an example of a device memory controller 155. The memory system controller 215, among other portions of the memory system 210, may be configured for communicative coupling with or between the host system 205 (e.g., via one or more channels 245, which may be an example of channels 115) and memory device 220 which may include one or more memory dies 240 (e.g., memory dies 160, dynamic random access memory (DRAM) dies, among other types of memory dies, memory dies 240-*a* through 240-N). For example, the memory system controller 215 may be configured to manage aspects of access operations on memory dies 240 (e.g., via channels 250), which may be commanded by the host system 205, or which may be otherwise determined at the memory system controller 215 (e.g., without a command from the host system 205).

The memory system controller 215 may be an example of a CXL controller, and may include a bit analyzer 225, a bit inverter 230, or an error correction controller 235, among other components or combinations thereof. Each of the components of the memory system controller 215 may refer to a portion of hardware, firmware, software (e.g., stored in a non-transitory computer readable medium of the memory system controller 215), or any combination thereof that is configured to support a functionality of the memory system controller 215. In some examples, the memory system controller 215 may function as an error handler (e.g., a poison bit handler). For example, the memory system controller 215 may determine that an error is present in data read from the memory device 220 or received from the host system 205, and may initiate and execute various corrective actions in response. In other examples, a standalone component included in the memory system controller 215 may function as the error handler, rather than the memory system controller 215.

The bit analyzer 225, the bit inverter 230, and the error correction controller 235 may be configured to support communication of information or data (e.g., one or more bits) between the memory system 210 (e.g., the memory system controller 215, the memory device 220) and the host system 205. The memory system controller 215 may use the bit analyzer 225 to read (e.g., analyze) bits of data communicated between the host system 205 and the memory system 210. For example, the bit analyzer 225 may be configured to remove (e.g., discard) bits from data received from the host system 205, or may insert (e.g., add) bits into data to be transmitted to the host system 205.

The bit inverter 230 may be configured to invert one or more bits (e.g., flip bits, change the current binary state of the bit to the opposite binary state) in response to the bit analyzer 225 analyzing (e.g., reading, adjusting) the bits. The error correction controller 235 may be configured to support detection and correction of errors included in data (e.g., in one or more bits) communicated between the host system 205 and the memory device 220. For example, the error correction controller 235 may receive data from the host system 205 or stored data from the memory device 220 and may subsequently conduct one or more error control operations on the bits of the data to determine if an error is present.

In some examples, the memory system controller 215 (or a component thereof) may determine an error in data stored in the memory dies 240 of the memory device 220. For example, the memory system controller 215 may receive a command (e.g., a read command) to read data stored in the memory device 220. The memory system controller 215 may subsequently read the data and perform an error control operation on the data to determine whether it includes any errors. If the memory system controller 215 identifies one or more erroneous bits, the memory system controller 215 may generate and transmit an indication (e.g., a flag) of the error to the host system 205 (along with the data) without storing the indication to the memory device 220 (e.g., memory dies 240). In some examples, the flag may be communicated by setting a designated bit (or bits) to a value or by driving one or more pins to a value (e.g., a high value). In other examples, the indication may be a standalone flag (e.g., a repeat code) transmitted to the host system 205 with the data. By refraining from storing the indication to the memory device 220, the memory device 220 may include additional storage and the complexity of the memory system 210 may be reduced. In some examples, the indication may be a set bit of the data transmitted to the host system 205.

In some examples, the host system 205 may intentionally transmit corrupt data to the memory system 210. For example, the data may include an indication (e.g., a flag, a poison bit) to the memory system controller 215. Upon receiving the data and the indication, the memory system controller 215 may initiate and execute various operations. For example, in the case of invalid data, the bit analyzer 225 may discard the bit indicating the erroneous data (e.g., the bit analyzer 225 may discard the poison bit). In response to the bit analyzer 225 discarding the bit, the bit inverter 230 may invert the remaining bits (e.g., a subset of bits, the bits other than the error indication bit). In some instances, the error correction controller 235 may perform an error control operation prior to the bits being inverted. For example, the error correction controller 235 may generate one or more parity bits (e.g., a first set of parity bits) using the non-inverted data. The first set of parity bits may be stored with the inverted bits (e.g., at the memory device 220).

The memory system controller 215 may then transmit the inverted subset of bits to the memory device 220 via the channels 250, and the inverted bits may be stored to the memory dies 240. In some examples, the memory system controller 215 may also transmit the first set of parity bits generated by the error correction controller 235. As such, the memory device 220 may store the inverted subset of bits and the first set of parity bits without storing the error indicator bit, which may result in more available storage in the memory device 220 and the associated memory dies 240.

In some examples, the host system 205 may transmit a read command for the previously stored data (e.g., the previously inverted data). For example, in response to receiving a read command, the memory system controller 215 may read the inverted subset of bits from the memory device 220. The error correction controller 235 may determine if the data is valid by performing an error control operation on the inverted bits. For example, the error correction controller 235 may generate one or more parity bits (e.g., a second set of parity bits) using the inverted data. The error correction controller 235 may then determine whether the first set of parity bits matches the second set of parity bits.

In some examples, the first set of parity bits may not match the second set of parity bits (e.g., the first error correction code (ECC) test may fail). In the case that the ECC test fails, the bit inverter 230 may invert the subset of bits again (e.g., reinvert the subset of bits). The error correction controller 235 may generate one or more parity bits (e.g., a third set of parity bits) using the non-inverted data. The error correction controller 235 may then determine whether the first set of parity bits matches the third set of parity bits. In some examples, the error correction controller 235 may determine that the first set of parity bits matches the third set of parity bits, which may indicate that no error is included in the subset of data (e.g., the second ECC test passes).

In response to the reinverted subset of bits failing the first error control operation (e.g., failing the first ECC test) and passing the second error control operation (e.g., passing the second ECC test), the bit analyzer 225 may generate an indicator bit (e.g., a flag) indicating that the subset of bits is corrupt (e.g., poisoned). Subsequently, the memory system controller 215 may transmit the generated indicator and the subset of data to the host system 205. By transmitting indications of corrupt data as described herein, the memory system 210 may store less data which may decrease its complexity and increase its overall reliability.

Figure 3:
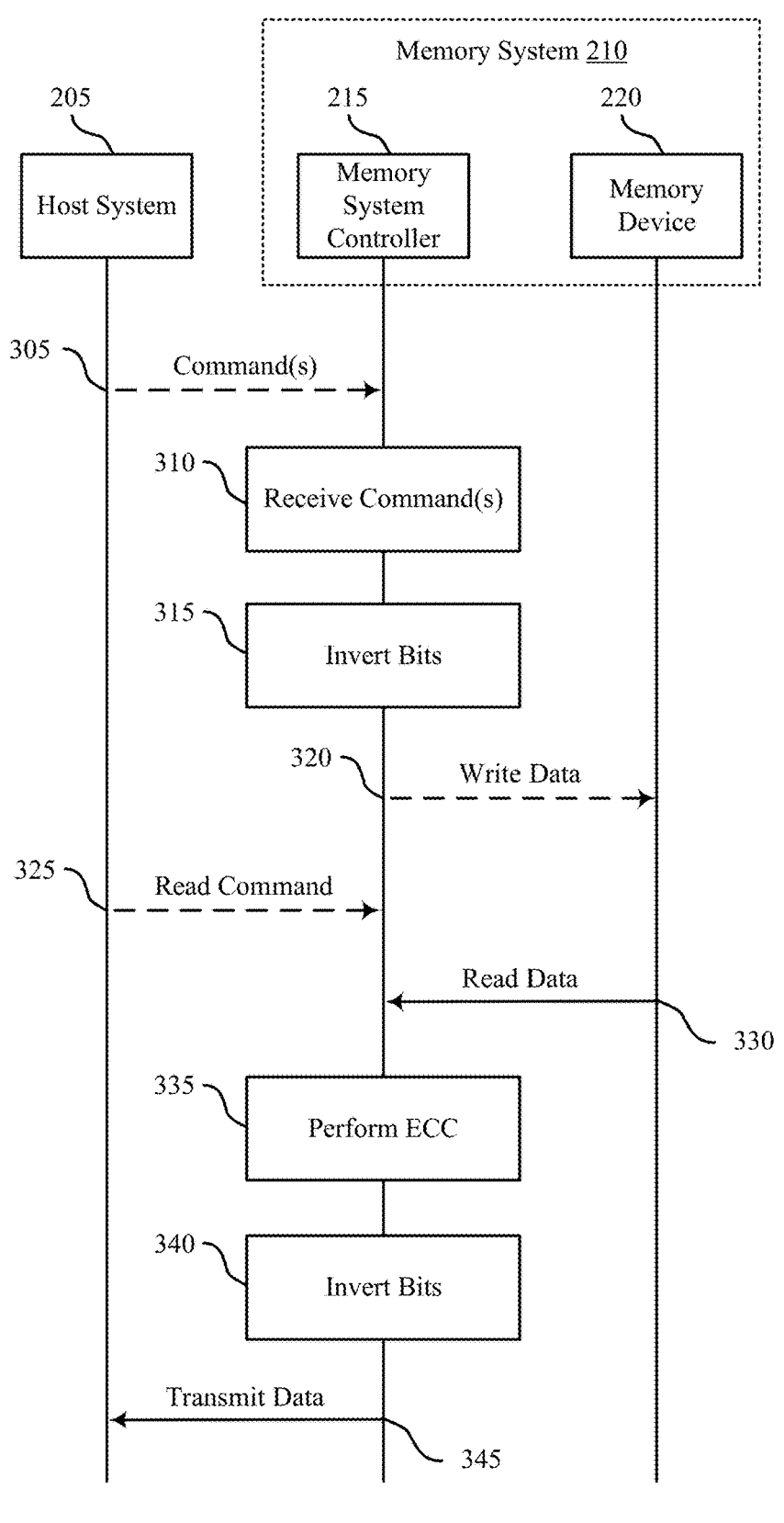
FIGS. 3 and 4 illustrate examples of process flows that support error tracking by a memory system in accordance with examples as disclosed herein.

FIG. 3 illustrates an example of a process flow 300 that supports error tracking by a memory system in accordance with examples as disclosed herein. The process flow 300 may illustrate aspects or operations of systems 100 or 200. For example, the process flow 300 may depict operations involving a host system 205 and a memory system 210 (e.g., including at least a memory system controller 215 and memory device 220), as described with reference to FIG. 2. In some examples, operations of the process flow 300 may be performed in different orders or at different times. Further, at least some operations may be omitted from the process flow 300, or other operations may be added to the process flow 300. By transmitting indications of corrupt data as described herein, the memory system 210 may store less data which may decrease its complexity and increase its overall reliability.

Aspects of the process flow 300 may be implemented by a controller, among other components. Additionally, or alternatively, aspects of the process flow 300 may be implemented as instructions stored in memory (e.g., firmware stored in a memory coupled with a host system or a memory system). For example, the instructions, when executed by a controller (e.g., the memory system controller 215), may cause the controller to perform the operations of the process flow 300.

At 305, the host system 205 may transmit or more commands to be performed by the memory system controller 215 (e.g., the memory system 210). The command (e.g., commands) may include access commands, memory management commands, or other types of indications of operations to be performed by the memory system controller 215. For example, the command may include a command to write data (e.g., one or more bits) to the memory device 220.

At 310, the memory system controller 215 may receive the command(s) transmitted by the host system 205. For example, the command(s) may include a command to write data (e.g., a first set of data that includes multiple bits) to the memory device 220. In some cases, a bit (e.g., a first bit) of the data may include an indicator of the validity of the data (e.g., of the first set of data). As such, this bit may indicate that one or more of the other data bits (e.g., the data bits besides the first bit) includes an error.

At 315, the memory system controller 215 may invert a portion of the received bits (e.g., a second set of data). For example, in response to receiving the indication of an error in the bits, the memory system controller 215 (or a component thereof) may discard (e.g., remove) the error indication bit from the data while retaining the subset of data bits besides the error indication bit. The memory system controller 215 (or a component thereof) may then invert one or more of the remaining bits (e.g., flip bits, change the current binary state of the bit to the opposite binary states).

At 320, the memory system controller 215 may write the inverted data (e.g., the inverted subset of data) to the memory device 220. For example, in response to inverting the data, the memory system controller 215 may write the inverted data (which may include one or more errors) to the memory device 220. As such, the error indication bit may not be written to the memory device 220, which may result in more available storage space in the memory device 220 (e.g., in relation to if the error indication bit was stored). In other examples (not shown), the memory system controller 215 may also write one or more parity bits to the memory device 220 with the inverted data. As described herein, the parity bits (e.g., a first set of parity bits) may have been generated using the non-inverted data.

At 325, the host system 205 may transmit a second command to the memory system controller 215 (e.g., the memory system 210) in response to the memory system controller 215 writing the inverted data to the memory device 220. For example, the host system 205 may transmit a command to the memory system controller 215 to read data previously stored in the memory device 220 (e.g., the data stored at 320).

At 330, the memory system controller 215 may read the inverted (e.g., previously-stored) data from the memory device 220.

At 335, the memory system controller 215 may perform an ECC test on the data read from the memory device 220. For example, the memory system controller 215, or a component thereof, may perform an error control operation (e.g., a ECC test) on the data. The ECC test may fail due to the data being inverted.

At 340, the memory system controller 215, or a component thereof, may invert (e.g., reinvert) the inverted data read from the memory device 220. As such, the memory system controller 215 may invert (e.g., reinvert) the inverted data read from the memory device 220. As such, the reinverted data (e.g., a third set of data) may include the original subset of data. In some examples (not shown), the memory system controller 215 may perform a second ECC test on the data. The second ECC test may pass due to the reinverted data matching the original data received from the host system 205. In response to the second ECC test being successful, the memory system controller 215, or a component thereof, may reinsert (e.g., generate and attach) the error indication bit to the data.

At 345, the memory system controller 215 may transmit, and the host system 205 may receive, the reinverted data and the error indication bit. By transmitting indications of corrupt data as described herein, the memory system 210 may store less data which may decrease its complexity and increase its overall reliability.

Figure 4:
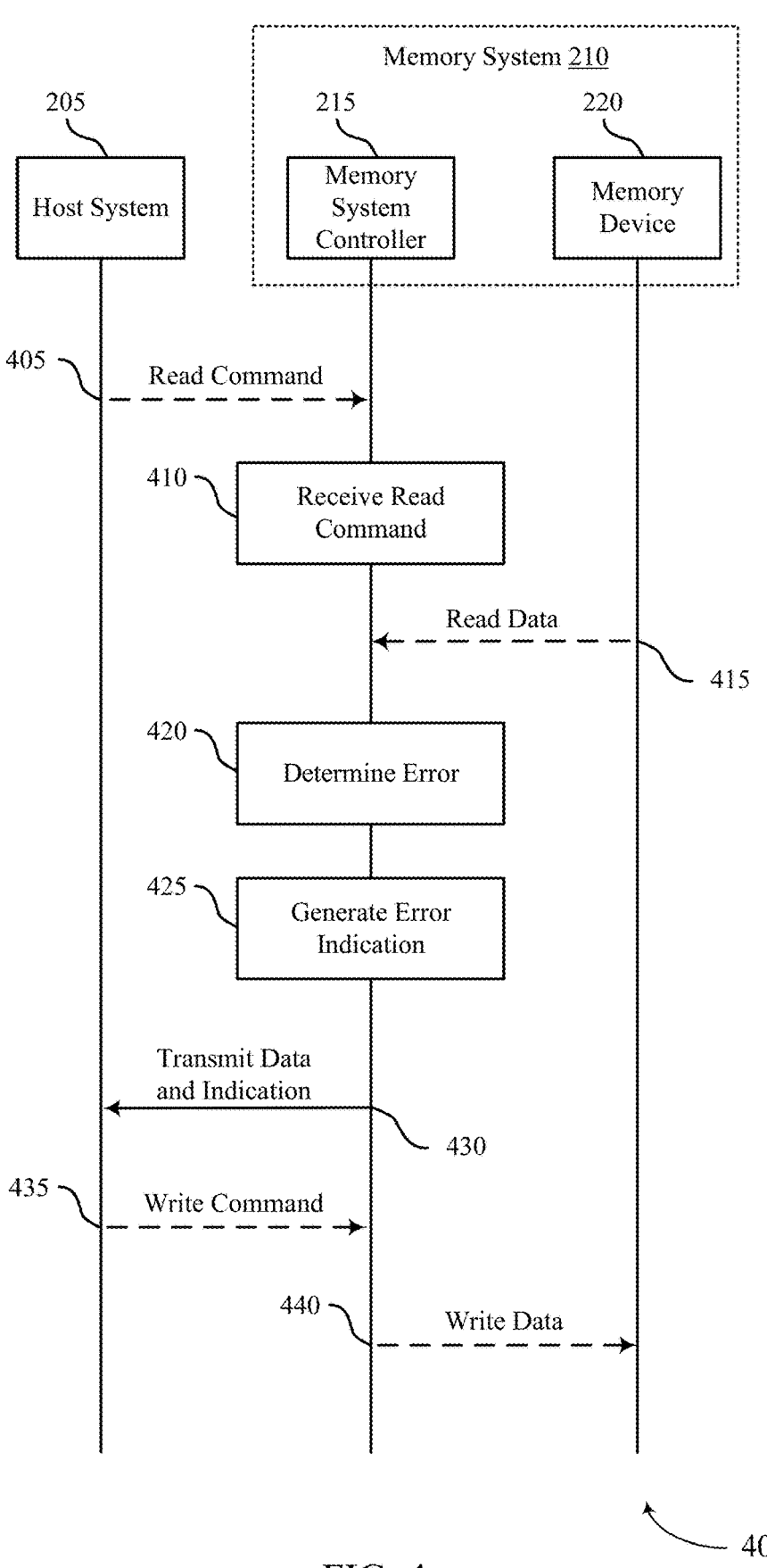

FIG. 4 illustrates an example of a process flow 400 that supports error tracking by a memory system in accordance with examples as disclosed herein. The process flow 400 may illustrate aspects or operations of systems 100 or 200. For example, the process flow 400 may depict operations involving a host system 205 and a memory system 210 (e.g., including at least a memory system controller 215 and memory device 220), as described with reference to FIG. 2. In some examples, operations of the process flow 400 may be performed in different orders or at different times. Further, at least some operations may be omitted from the process flow 400, or other operations may be added to the process flow 400. By transmitting indications of corrupt data as described herein, the memory system 210 may store less data which may decrease its complexity and increase its overall reliability.

Aspects of the process flow 400 may be implemented by a controller, among other components. Additionally, or alternatively, aspects of the process flow 400 may be implemented as instructions stored in memory (e.g., firmware stored in a memory coupled with a host system or a memory system). For example, the instructions, when executed by a controller (e.g., the memory system controller 215), may cause the controller to perform the operations of the process flow 400.

At 405, the host system 205 may transmit or more commands to be performed by the memory system controller 215 (e.g., the memory system 210). The command may include access commands, memory management commands, or other types of indications of operations to be performed by the memory system controller 215. For example, the command may include a command to read data (e.g., one or more bits) from the memory device 220.

At 410, the memory system controller 215 may receive the read command transmitted by the host system 205. For example, the command may include a command to read data from the memory device 220.

At 415, the memory system controller 215 may read the data associated with the read command from the memory device 220.

At 420, the memory system controller 215 may determine that an error is included in the data read from the memory device 220. For example, the memory system controller 215, or a component thereof, may perform an error control operation (e.g., a ECC test) on the read data, and the error control operation may indicate an error in the read data (e.g., the test may fail).

At 425, the memory system controller 215 may generate an error indication bit. For example, in response to the ECC test indicating an error in the read data, the memory system controller 215, or a component thereof, may generate an error indication bit indicating one or more errors may be included in the data read from the memory device 220. The memory controller may refrain from storing the generated error indication bit to the memory device 220.

At 430, the memory system controller 215 may transmit, and the host system 205 may receive, the read data and the generated error indication bit. The memory system controller 215 may transmit the read data (including the error) and the error indication bit in response to the memory system controller 215 generating the error indication bit.

At 435, the host system 205 may transmit, and the memory system controller 215 may receive, another command to the memory system controller 215. For example, the command may include a command to write the data (e.g., one or more bits) to the memory device 220 associated with the memory system controller 215. In some instances, the data may be a corrected version of the data read from the memory device 220 (e.g., at 415).

At 440, the memory system controller 215 may write the data to the memory device 220. For example, in response to transmitting the data to the host system 205 and subsequently receiving the write command, the memory system controller 215 may write the data (which may include one or more errors) to the memory device 220. By transmitting indications of corrupt data as described herein, the memory system 210 may store less data which may decrease its complexity and increase its overall reliability.

Figure 5:
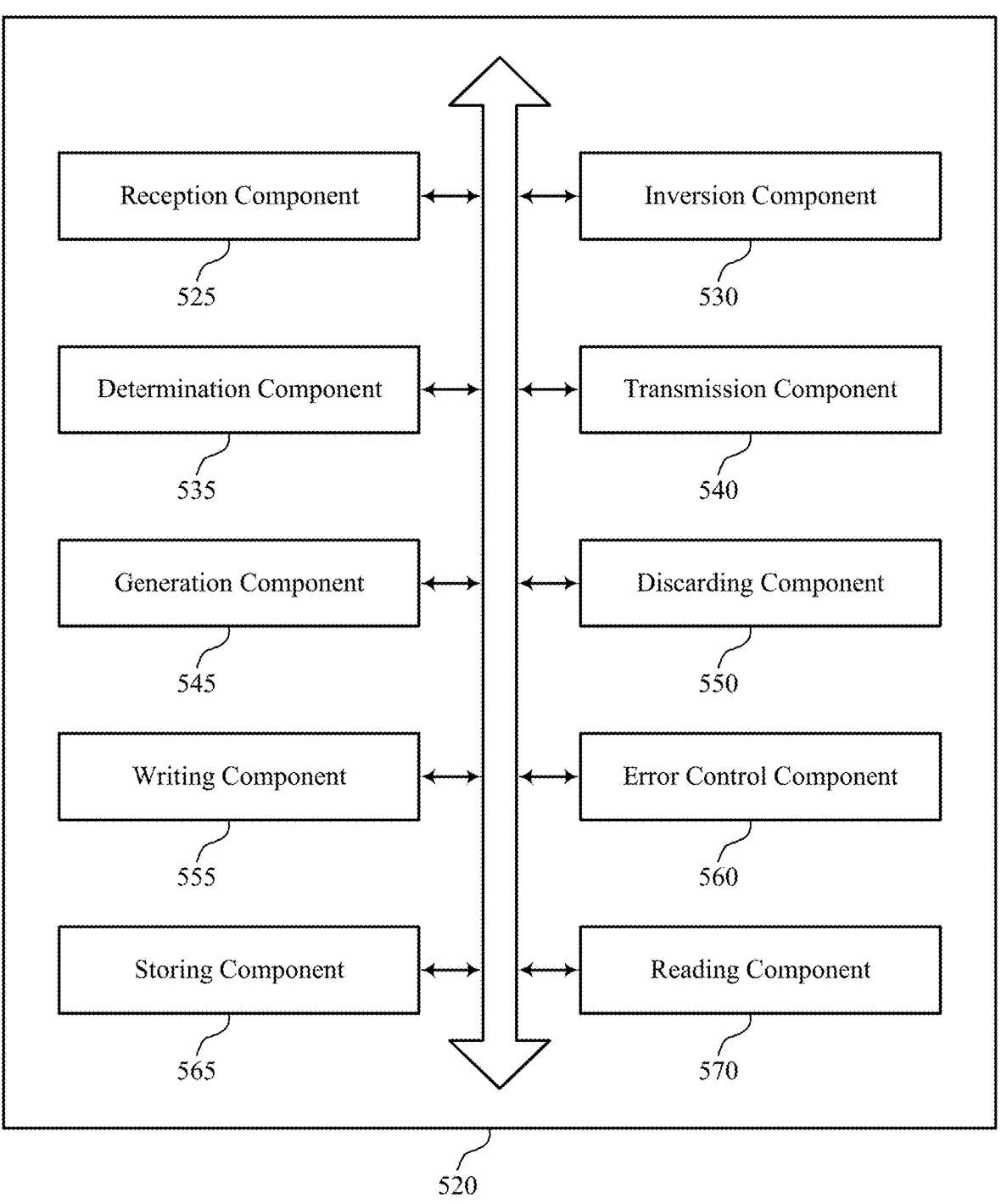
FIG. 5 illustrates a block diagram of a memory system that supports error tracking by a memory system in accordance with examples as disclosed herein.

FIG. 5 illustrates a block diagram 500 of a memory system 520 that supports error tracking by a memory system in accordance with examples as disclosed herein. The memory system 520 may be an example of aspects of a memory system as described with reference to FIGS. 1 through 4. The memory system 520, or various components thereof, may be an example of means for performing various aspects of error tracking by a memory system as described herein. For example, the memory system 520 may include a reception component 525, an inversion component 530, a determination component 535, a transmission component

540, a generation component 545, a discarding component 550, a writing component 555, an error control component 560, a storing component 565, a reading component 570, or any combination thereof. Each of these components may communicate, directly or indirectly, with one another (e.g., via one or more buses).

The reception component 525 may be configured as or otherwise support a means for receiving a write command to write a first set of data that includes a plurality of bits to a memory system, at least a first bit of the plurality of bits indicating a validity of the first set of data. The inversion component 530 may be configured as or otherwise support a means for inverting, at a first instance, a subset of the plurality of bits to generate a second set of data based on at least the first bit indicating that the first set of data is invalid. The determination component 535 may be configured as or otherwise support a means for determining that one or more bits of the subset of the plurality of bits include an error based on inverting the subset of the plurality of bits. In some examples, the inversion component 530 may be configured as or otherwise support a means for inverting, at a second instance after the first instance, the subset of the plurality of bits to generate a third set of data based on determining that the one or more bits of the subset of the plurality of bits includes an error. The transmission component 540 may be configured as or otherwise support a means for transmitting a fourth set of data that includes the third set of data and a second bit indicating that the third set of data is invalid based on inverting the subset of the plurality of bits at the second instance.

In some examples, the discarding component 550 may be configured as or otherwise support a means for discarding at least the first bit of the plurality of bits, where inverting the subset of the plurality of bits at the first instance is based on discarding at least the first bit.

In some examples, the writing component 555 may be configured as or otherwise support a means for writing the second set of data to a memory device of the memory system based on inverting the subset of the plurality of bits at the first instance, where determining that the one or more bits of the subset of the plurality of bits includes the error is based on writing the second set of data to the memory device.

In some examples, the reception component 525 may be configured as or otherwise support a means for receiving a read command for the first set of data based on writing the second set of data to the memory device. In some examples, the reading component 570 may be configured as or otherwise support a means for reading the second set of data from the memory device based on receiving the read command, where inverting the subset of the plurality of bits at the second instance is based on reading the subset of the plurality of bits.

In some examples, to support determining that the one or more bits of the subset of the plurality of bits includes the error, the error control component 560 may be configured as or otherwise support a means for performing an error control operation on the second set of data.

In some examples, the error control component 560 may be configured as or otherwise support a means for performing, at a second instance, the error control operation on the third set of data, where transmitting the fourth set of data that includes the third set of data and the second bit indicating that the third set of data is invalid is based on performing the error control operation at the second instance.

In some examples, the generation component 545 may be configured as or otherwise support a means for generating the second bit based on performing the error control operation at the second instance.

In some examples, the reception component 525 may be configured as or otherwise support a means for receiving a read command for data stored to a memory device of a memory system. In some examples, the determination component 535 may be configured as or otherwise support a means for determining that the data stored to the memory device includes one or more errors. The generation component 545 may be configured as or otherwise support a means for generating an indication that the data includes one or more errors based on determining that the data stored to the memory device includes one or more errors. In some examples, the transmission component 540 may be configured as or otherwise support a means for transmitting the data and the indication that the data includes the one or more errors to a host device.

In some examples, the storing component 565 may be configured as or otherwise support a means for refraining from storing the indication that the data includes one or more errors to the memory device based on generating the indication.

In some examples, to support determining that that the data stored to the memory device includes one or more errors, the error control component 560 may be configured as or otherwise support a means for performing an error control operation on the data.

In some examples, the reception component 525 may be configured as or otherwise support a means for receiving a write command including the data based on transmitting the data and the indication that the data includes the one or more errors to the host device. In some examples, the writing component 555 may be configured as or otherwise support a means for writing the data to the memory device based on receiving the write command.

FIG. 6 illustrates a flowchart showing a method 600 that supports error tracking by a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the system to perform the described functions. Additionally, or alternatively, the memory system may perform aspects of the described functions using special-purpose hardware.

At 605, the method may include receiving a write command to write a first set of data that includes a plurality of bits to a memory system, at least a first bit of the plurality of bits indicating a validity of the first set of data. The operations of 605 may be performed in accordance with examples as disclosed herein. In some examples, aspects of the operations of 605 may be performed by a reception component 525 as described with reference to FIG. 5.

At 610, the method may include inverting, at a first instance, a subset of the plurality of bits to generate a second set of data based on at least the first bit indicating that the first set of data is invalid. The operations of 610 may be performed in accordance with examples as disclosed herein. In some examples, aspects of the operations of 610 may be performed by an inversion component 530 as described with reference to FIG. 5.

At 615, the method may include determining that one or more bits of the subset of the plurality of bits include an error based on inverting the subset of the plurality of bits. The operations of 615 may be performed in accordance with examples as disclosed herein. In some examples, aspects of the operations of 615 may be performed by a determination component 535 as described with reference to FIG. 5.

At 620, the method may include inverting, at a second instance after the first instance, the subset of the plurality of bits to generate a third set of data based on determining that the one or more bits of the subset of the plurality of bits includes an error. The operations of 620 may be performed in accordance with examples as disclosed herein. In some examples, aspects of the operations of 620 may be performed by an inversion component 530 as described with reference to FIG. 5.

At 625, the method may include transmitting a fourth set of data that includes the third set of data and a second bit indicating that the third set of data is invalid based on inverting the subset of the plurality of bits at the second instance. The operations of 625 may be performed in accordance with examples as disclosed herein. In some examples, aspects of the operations of 625 may be performed by a transmission component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a write command to write a first set of data that includes a plurality of bits to a memory system, at least a first bit of the plurality of bits indicating a validity of the first set of data; inverting, at a first instance, a subset of the plurality of bits to generate a second set of data based on at least the first bit indicating that the first set of data is invalid; determining that one or more bits of the subset of the plurality of bits include an error based on inverting the subset of the plurality of bits; inverting, at a second instance after the first instance, the subset of the plurality of bits to generate a third set of data based on determining that the one or more bits of the subset of the plurality of bits includes an error; and transmitting a fourth set of data that includes the third set of data and a second bit indicating that the third set of data is invalid based on inverting the subset of the plurality of bits at the second instance.

Aspect 2: The method, apparatus, or non-transitory computer-readable medium of aspect 1, further including operations, features, circuitry, logic, means, or instructions, or any combination thereof for discarding at least the first bit of the plurality of bits, where inverting the subset of the plurality of bits at the first instance is based on discarding at least the first bit.

Aspect 3: The method, apparatus, or non-transitory computer-readable medium of any of aspects 1 through 2, further including operations, features, circuitry, logic, means, or instructions, or any combination thereof for writing the second set of data to a memory device of the memory system based on inverting the subset of the plurality of bits at the first instance, where determining that the one or more bits of the subset of the plurality of bits includes the error is based on writing the second set of data to the memory device.

Aspect 4: The method, apparatus, or non-transitory computer-readable medium of aspect 3, further including operations, features, circuitry, logic, means, or instructions, or any combination thereof for receiving a read command for the first set of data based on writing the second set of data to the memory device and reading the second set of data from the memory device based on receiving the read command, where inverting the subset of the plurality of bits at the second instance is based on reading the subset of the plurality of bits.

Aspect 5: The method, apparatus, or non-transitory computer-readable medium of any of aspects 1 through 4, where determining that the one or more bits of the subset of the plurality of bits includes the error includes operations, features, circuitry, logic, means, or instructions, or any combination thereof for performing an error control operation on the second set of data.

Aspect 6: The method, apparatus, or non-transitory computer-readable medium of aspect 5, further including operations, features, circuitry, logic, means, or instructions, or any combination thereof for performing, at a second instance, the error control operation on the third set of data, where transmitting the fourth set of data that includes the third set of data and the second bit indicating that the third set of data is invalid is based on performing the error control operation at the second instance.

Aspect 7: The method, apparatus, or non-transitory computer-readable medium of aspect 6, further including operations, features, circuitry, logic, means, or instructions, or any combination thereof for generating the second bit based on performing the error control operation at the second instance.

FIG. 7 illustrates a flowchart showing a method 700 that supports error tracking by a memory system in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include receiving a read command for data stored to a memory device of a memory system. The operations of 705 may be performed in accordance with examples as disclosed herein. In some examples, aspects of the operations of 705 may be performed by a reception component 525 as described with reference to FIG. 5.

At 710, the method may include determining that the data stored to the memory device includes one or more errors. The operations of 710 may be performed in accordance with examples as disclosed herein. In some examples, aspects of the operations of 710 may be performed by a determination component 535 as described with reference to FIG. 5.

At 715, the method may include generating an indication that the data includes one or more errors based on determining that the data stored to the memory device includes one or more errors. The operations of 715 may be performed in accordance with examples as disclosed herein. In some examples, aspects of the operations of 715 may be performed by a generation component 545 as described with reference to FIG. 5.

At 720, the method may include transmitting the data and the indication that the data includes the one or more errors to a host device. The operations of 720 may be performed in accordance with examples as disclosed herein. In some examples, aspects of the operations of 720 may be performed by a transmission component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for receiving a read command for data stored to a memory device of a memory system; determining that the data stored to the memory device includes one or more errors; generating an indication that the data includes one or more errors based on determining that the data stored to the memory device includes one or more errors; and transmitting the data and the indication that the data includes the one or more errors to a host device.

Aspect 9: The method, apparatus, or non-transitory computer-readable medium of aspect 8, further including operations, features, circuitry, logic, means, or instructions, or any combination thereof for refraining from storing the indication that the data includes one or more errors to the memory device based on generating the indication.

Aspect 10: The method, apparatus, or non-transitory computer-readable medium of any of aspects 8 through 9, where determining that that the data stored to the memory device includes one or more errors includes operations, features, circuitry, logic, means, or instructions, or any combination thereof for performing an error control operation on the data.

Aspect 11: The method, apparatus, or non-transitory computer-readable medium of any of aspects 8 through 10, further including operations, features, circuitry, logic, means, or instructions, or any combination thereof for receiving a write command including the data based on transmitting the data and the indication that the data includes the one or more errors to the host device and writing the data to the memory device based on receiving the write command.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving a write command to write a first set of data that comprises a plurality of bits to a memory system, at least a first bit of the plurality of bits indicating a validity of the first set of data;
inverting, at a first instance, a subset of the plurality of bits to generate a second set of data based on at least the first bit indicating that the first set of data is invalid;
determining that one or more bits of the subset of the plurality of bits comprise an error based on inverting the subset of the plurality of bits;
inverting, at a second instance after the first instance, the subset of the plurality of bits to generate a third set of data based on determining that the one or more bits of the subset of the plurality of bits comprises the error; and
transmitting a fourth set of data that comprises the third set of data and a second bit indicating that the third set of data is invalid based on inverting the subset of the plurality of bits at the second instance.

2. The method of claim 1, further comprising:
discarding at least the first bit of the plurality of bits, wherein inverting the subset of the plurality of bits at the first instance is based on discarding at least the first bit.

3. The method of claim 1, further comprising:
writing the second set of data to a memory device of the memory system based on inverting the subset of the plurality of bits at the first instance, wherein determining that the one or more bits of the subset of the plurality of bits comprises the error is based on writing the second set of data to the memory device.

4. The method of claim 3, further comprising:
receiving a read command for the first set of data based on writing the second set of data to the memory device; and
reading the second set of data from the memory device based on receiving the read command, wherein inverting the subset of the plurality of bits at the second instance is based on reading the subset of the plurality of bits.

5. The method of claim 1, wherein determining that the one or more bits of the subset of the plurality of bits comprises the error comprises:
performing an error control operation on the second set of data.

6. The method of claim 5, further comprising:
performing, at the second instance, the error control operation on the third set of data, wherein transmitting the fourth set of data that comprises the third set of data and the second bit indicating that the third set of data is invalid is based on performing the error control operation at the second instance.

7. The method of claim 6, further comprising:
generating the second bit based on performing the error control operation at the second instance.

8. A method, comprising:
receiving a read command for data stored to a memory device of a memory system;
determining that the data stored to the memory device comprises one or more errors;
generating an inverted version of the data and an indication that the data comprises the one or more errors, wherein both the inverted version of the data and the indication that the data comprises the one or more errors are generated based on determining that the data stored to the memory device comprises the one or more errors; and
transmitting, based on generating the inverted version of the data and the indication that the data comprises the one or more errors, the inverted version of the data and the indication that the data comprises the one or more errors to a host device.

9. The method of claim 8, further comprising:
refraining from storing the indication that the data comprises the one or more errors to the memory device based on generating the indication.

10. The method of claim 8, wherein determining that the data stored to the memory device comprises the one or more errors comprises:
performing an error control operation on the data.

11. The method of claim 8, further comprising:
receiving a write command comprising the data based on transmitting the data and the indication that the data comprises the one or more errors to the host device; and writing the data to the memory device based on receiving the write command.

12. A non-transitory computer-readable medium storing code, the code comprising instructions executable by a processor to:

receive a write command to write a first set of data that comprises a plurality of bits to a memory system, at least a first bit of the plurality of bits indicating a validity of the first set of data;

inverting, at a first instance, a subset of the plurality of bits to generate a second set of data based on at least the first bit indicating that the first set of data is invalid;

determine that one or more bits of the subset of the plurality of bits comprise an error based on inverting the subset of the plurality of bits;

inverting, at a second instance after the first instance, the subset of the plurality of bits to generate a third set of data based on determining that the one or more bits of the subset of the plurality of bits comprises the error; and transmit a fourth set of data that comprises the third set of data and a second bit indicating that the third set of data is invalid based on inverting the subset of the plurality of bits at the second instance.

13. The non-transitory computer-readable medium of claim 12, wherein the instructions are further executable by the processor to:

discard at least the first bit of the plurality of bits, wherein inverting the subset of the plurality of bits at the first instance is based on discarding at least the first bit.

14. The non-transitory computer-readable medium of claim 12, wherein the instructions are further executable by the processor to:

write the second set of data to a memory device of the memory system based on inverting the subset of the plurality of bits at the first instance, wherein determining that the one or more bits of the subset of the plurality of bits comprises the error is based on writing the second set of data to the memory device.

15. The non-transitory computer-readable medium of claim 14, wherein the instructions are further executable by the processor to:

receive a read command for the first set of data based on writing the second set of data to the memory device; and read the second set of data from the memory device based on receiving the read command, wherein inverting the subset of the plurality of bits at the second instance is based on reading the subset of the plurality of bits.

16. The non-transitory computer-readable medium of claim 12, wherein the instructions to determine that the one or more bits of the subset of the plurality of bits comprises the error are executable by the processor to:

perform an error control operation on the second set of data.

17. The non-transitory computer-readable medium of claim 16, wherein the instructions are further executable by the processor to:

perform, at the second instance, the error control operation on the third set of data, wherein transmitting the fourth set of data that comprises the third set of data and the second bit indicating that the third set of data is invalid is based on performing the error control operation at the second instance.

18. The non-transitory computer-readable medium of claim 17, wherein the instructions are further executable by the processor to:

generate the second bit based on performing the error control operation at the second instance.

19. An apparatus, comprising: a controller associated with a memory device, wherein the controller is configured to cause the apparatus to:

receive a write command to write a first set of data that comprises a plurality of bits to a memory system, at least a first bit of the plurality of bits indicating a validity of the first set of data;

inverting, at a first instance, a subset of the plurality of bits to generate a second set of data based on at least the first bit indicating that the first set of data is invalid;

determine that one or more bits of the subset of the plurality of bits comprise an error based on inverting the subset of the plurality of bits;

inverting, at a second instance after the first instance, the subset of the plurality of bits to generate a third set of data based on determining that the one or more bits of the subset of the plurality of bits comprises the error; and transmit a fourth set of data that comprises the third set of data and a second bit indicating that the third set of data is invalid based on inverting the subset of the plurality of bits at the second instance.

20. The apparatus of claim 19, wherein the controller is further configured to cause the apparatus to:

discard at least the first bit of the plurality of bits, wherein inverting the subset of the plurality of bits at the first instance is based on discarding at least the first bit.

* * * * *